United States Patent [19]

Hall

[11] Patent Number: 4,941,757

[45] Date of Patent: Jul. 17, 1990

[54] GREASE RESERVOIR

[75] Inventor: David F. Hall, Naples, N.Y.

[73] Assignee: Eastman Kodak Company, Rochester, N.Y.

[21] Appl. No.: 387,192

[22] Filed: Jul. 31, 1989

[51] Int. Cl.$^5$ .............................................. F16C 33/66
[52] U.S. Cl. ..................................... 384/473; 384/474
[58] Field of Search ............... 384/473, 474, 462, 374, 384/400

[56] References Cited

U.S. PATENT DOCUMENTS

| | | |
|---|---|---|
| 818,787 | 4/1906 | Rader et al. . |
| 2,249,501 | 10/1940 | Teker . |
| 2,269,606 | 1/1942 | Spear . |
| 2,921,821 | 11/1957 | Reardon . |
| 2,959,457 | 11/1960 | Szymalak ............................. 384/473 |
| 3,420,590 | 1/1969 | Bilocq ................................. 384/473 |
| 3,432,215 | 3/1969 | Seay ..................................... 384/473 |
| 4,010,987 | 3/1977 | Jasperse et al. . |
| 4,571,098 | 2/1986 | Rudnik . |

Primary Examiner—Lenard A. Footland
Attorney, Agent, or Firm—Charles E. Snee

[57] ABSTRACT

A flexible arcuate one-piece reservoir member has a generally cylindrical outer surface with a flange projecting radially outwardly from that surface. The reservoir is attached to a conventional ball bearing by snapping the flange into a groove in the outer race of the bearing. Passageways extend through the reservoir member so that grease can be forced through the passageways into a cavity defined by the reservoir member and the adjacent portions of the bearing, thereby enabling grease in the bearing to ber replenished periodically.

4 Claims, 1 Drawing Sheet

GREASE RESERVOIR

This invention relates to a grease reservoir which can be conveniently mounted on a conventional bearing without modification of the bearing.

It is conventional to pack ball bearings and other types of bearings with a supply of grease, and to provide a reservoir of grease for replenishing lubricant in the grease that is used from the supply packed into the bearing. Grease used for lubricating bearings comprising a soap compound and oil. Oil in the grease migrates to the bearing through the soap. Thus for the oil to transfer from the grease in the reservoir to the bearing surface the grease must remain moist and in contact with grease in the bearing. It is this contact that provides the path for the transfer of oil through the soap. Typically the grease reservoir is formed in a housing adjacent the area where the bearing is to be mounted, or in the bearing itself, and new grease is furnished periodically to the reservoir through a grease fitting or nipple.

If the lubricating oil is exhausted from the grease in the bearing or the reservoir, it is necessary to remove the bearing, clean the reservoir and the bearing of all old grease, repack the bearing and provide a new supply of grease to the reservoir. This can be time consuming and expensive, sometimes requiring a skilled mechanic and, in view of the high cost and time involved, it is not unusual for the bearing to simply be disposed of and replaced with a new bearing. Accordingly, there is a need for a simple, inexpensive grease reservoir which can easily be attached to and removed from a bearing and which enables inspection of the condition of the grease in the bearing without removal of the bearing from its mounted condition.

Another problem with known grease reservoirs is that frequently they are specially formed in metallic structure surrounding the bearing installation and thus are expensive to manufacture. Also, the reservoir frequently is quite small, making it difficult to clean when there is a need to remove the old grease or residual soap. Thus it is desirable to provide a simple, inexpensive grease reservoir that can be easily mounted on and removed from a position where the grease in the reservoir is in contact with the grease in the bearing.

SUMMARY OF THE INVENTION

An object of the present invention is to provide a grease reservoir which can be mounted directly on the bearing itself and thus eliminate the need to form special reservoirs and structures surrounding the bearing. Another object of the invention is to provide a simple, inexpensive grease reservoir that can be easily snapped onto a bearing and removed from the bearing to permit quick and easy inspection of the condition of the grease in the bearing, and to clean and replenish the supply of grease in the reservoir, if necessary. A still further object of the invention is to provide a removable grease reservoir that can be mounted directly on a bearing and removed from it by an unskilled worker.

In accordance with the present invention a grease reservoir is provided for use with a bearing having an inner race and an outer race radially outward of the inner race. A generally circular groove in the outer race faces the inner race and is located at an end portion of the outer race. The reservoir has means defining a flexible arcuate reservoir member having spaced ends and a generally cylindrical outer surface extending from one end to the other end. A flange projects radially outwardly from one side edge of the outer surface. The flange is dimensioned relative to the groove in the bearing so that the flange can be positioned within the groove to attach the reservoir member to the bearing. The member is sufficiently flexible so that it can be flexed when positioning the flange in the groove and removing the flange from the groove. A passageway extends through the reservoir member in an axial direction so that grease can be forced into and through the passageway to the bearing when the member is attached to the bearing.

BRIEF DESCRIPTION OF THE DRAWINGS

In the detailed description of the preferred embodiment of the invention presented below, reference is made to the accompanying drawings, in which.

DETAILED DESCRIPTION OF THE INVENTION

Figure 1:
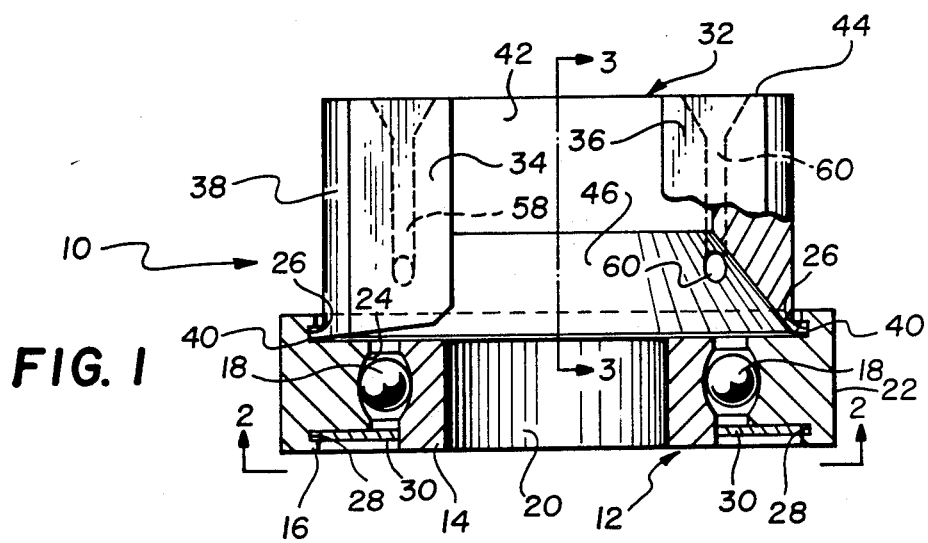
FIG. 1 is a view showing in cross section a conventional ball bearing and showing in plan view a grease reservoir of the invention with a portion of the reservoir being cut away to better illustrate mounting of the reservoir onto the bearing.

A grease reservoir of the invention is generally designated 10 and is specially adapted for use with a conventional bearing 12. The bearing 12 may comprise a known single row, shielded ball bearing. Ball bearings of this kind have a generally cylindrical inner race 14, a generally cylindrical outer race 16 and a plurality of spherical balls 18 located between the races. The inner race has a cylindrical radially inner surface 20 which can be fitted on a shaft or the like, and the outer race has a radially outer cylindrical surface 22 which can be mounted on an element or member that is stationary relative to the shaft.

The outer race 16 has a radially inner face 24 with a pair of circular grooves 26, 28 that face the inner race and are located at opposite end portions of the face 24 and on opposite sides of the balls 18. Shielded ball bearings of this kind typically have annular shields which fit in both of the grooves 26, 28 and extend between the outer race and the inner race on opposite sides of the balls 18 to retain grease inside the bearing for lubricating the balls and races during relative movement between the races and the balls. One such shield 30 is shown in groove 28. A reservoir 10 of the present invention replaces the other shield and is mounted in the groove 26 as described in more detail later.

Grease reservoir 10 comprises a flexible, arcuate reservoir member 32 of generally C-shaped configuration having spaced ends 34, 36. Member 32 has a generally cylindrical outer surface 38 extending from one end 34 to the other end 36 of the reservoir member. A narrow flange 40 projects radially outwardly from one end of the surface 38. The flange 40 is dimensioned relative to groove 26 in the bearing outer race 16 so that the flange can be positioned within the groove to attach the reservoir to the bearing as explained in more detail later.

Figure 3:
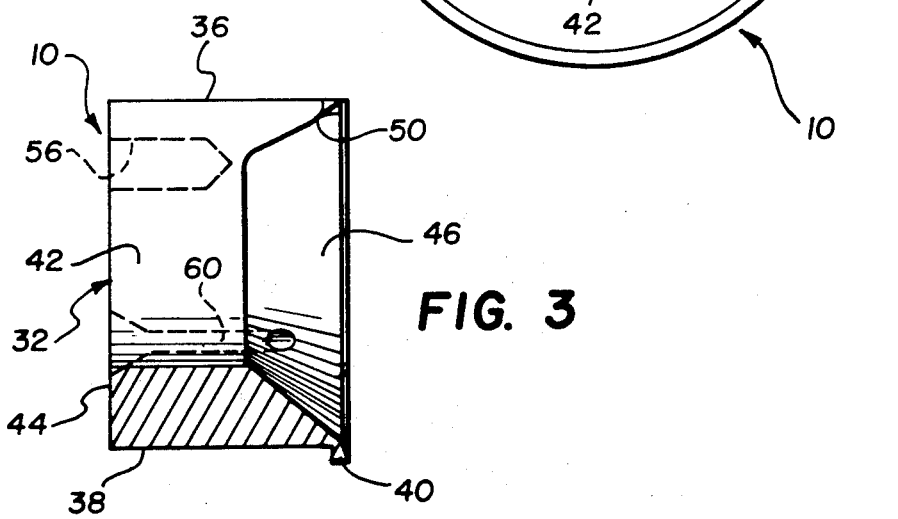
FIG. 3 is a section view of the reservoir taken generally along line 3—3 in FIG. 1.

The reservoir member also has a generally cylindrical inner surface 42 that is substantially concentric with the outer surface 38. A side 44 of the reservoir extends between surfaces 38, 40 and is substantially perpendicular to the axis of such surfaces as best illustrated in FIG. 3. The reservoir includes another side 46 extending from the inner cylindrical surface 42 to the flange 40 on the outer surface 38. Inner surface 42 is shorter in an axially direction that the surface 38, and thus the side 46 tapers inwardly from the outer surface and flange 40 to the inner surface 42.

Side 46 terminates at its ends in a pair of tabs 48, 50 at the ends 34, 36 of the member. The tabs on the outer surface thereof comprise an extension of the ends 34, 36 of the reservoir, and the inner surface of the tabs define an end to the recess in the reservoir defined by the tapered side 46 of the reservoir.

The reservoir surfaces 38, 42 extend about 240° to 260° about their axis, it is necessary to flex the ends 34, 36 toward each other in order to position the flange 40 in alignment with grooves 26 in the bearing during mounting of the reservoir on the bearing and removal of the reservoir from the bearing. For this purpose a pair of generally cylindrical openings 54, 56 are provided adjacent the ends 34, 36, respectively. These openings extend from side 44 of the reservoir about half way through the member 32 and terminate before they reach the side 46 of the reservoir.

The reservoir can be flexed by forming a tool (not shown) generally in the shape of a pair of pliers with the tool having a pair of projecting prongs at the ends opposite the handles that can be positioned in the openings 54, 56°. The handle of the tool is squeezed to move ends 34, 36 of the reservoir toward each other. With the reservoir thus deflected inwardly, the flange 40 can be positioned into, or removed from the groove 26 in the outer race of the bearing. When the flange is aligned with the groove 26 and the tool is released, the reservoir member flexes outwardly toward its normal (unflexed) position, thereby snapping the flange into the groove 26.

Figure 2:
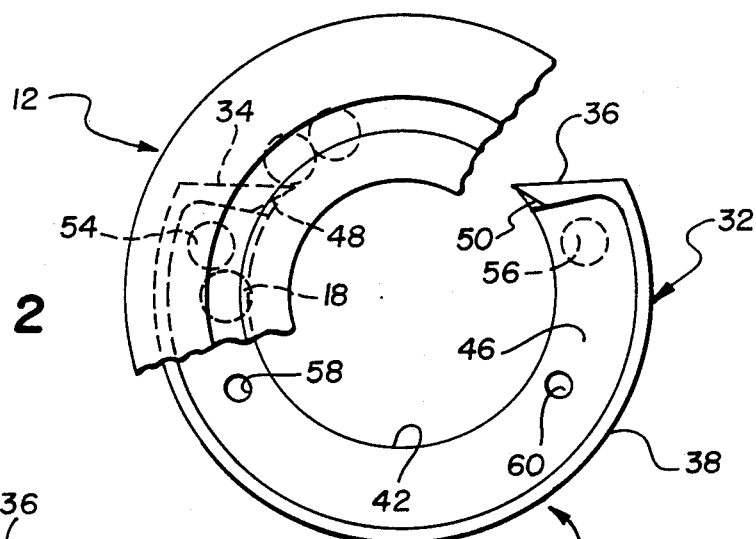
FIG. 2 is a view taken generally along line 2—2 in FIG. 1.

When the reservoir is mounted on the bearing as shown in FIGS. 1 and 2, the tapered side 46 of the reservoir faces the bearing and, more specifically, faces the balls 18 and the space between the inner and outer races of the bearing. Thus surface 46 of the reservoir and the adjacent portions of the bearing define a cavity for holding a supply of grease in a position where it is in contact with grease packed into the bearing between the inner and outer race.

In order to furnish additional grease into the cavity, a pair of passageways 58, 60 extend from face 44 of the reservoir into face 46. A grease gun or other suitable device can be used for forcing grease through the passageways 58, 60 into the cavity defined by the face 46 and the adjacent portions of the bearing. This enables the grease in the cavity to be replenished periodically without removal of the reservoir from the bearing. When it is desired to remove the reservoir and clean the reservoir, this is accomplished simply and easily by inserting the tool in the openings 54, 56, flexing the reservoir and removing it from the groove 26 of the bearing. Then the face 46 can be wiped clean and any excess grease moved from the adjacent portions of the bearing. The reservoir can again be snapped into place on the bearing and a fresh supply of grease furnished to the cavity in the bearing through passageways 58, 60.

When the bearing is rotated with grease in the cavity between the reservoir and the bearing, there is some tendency for the grease to travel along face 46 of the reservoir in the direction of movement of the adjacent portion of the bearing. The tabs 48, 50 block the flow of grease out of the cavity formed by face 46. The tabs not only seal the ends of the cavity to prevent loss of grease therefrom, they also deflect grease in the cavity towards the bearing to maintain contact between grease in the bearing and grease in the reservoir. This provides the path necessary for oil to flow from the reservoir to the bearing surfaces.

The invention has been described in detail with particular reference to a preferred embodiment thereof, but it will be understood that variations and modifications can be effected with the spirit and scope of the invention.

I claim:

1. A grease reservoir for use with a bearing having (1) an inner race, (2) an outer race radially outward of the inner race, and (3) a generally circular groove in the outer race facing the inner race and located at an end portion of the outer race, the reservoir comprising:

means defining a flexible arcuate reservoir member having spaced ends and a generally cylindrical outer surface extending from one end to the other end, a flange projecting radially outwardly from one side edge of the outer surface, the flange being dimensioned relative to the groove in the bearing so that the flange can be positioned within the groove to attach the member to the bearing, the member being sufficiently flexible so that it can be flexed to position the flange in the groove and to remove the flange from the groove, and a passageway extending through the reservoir member in an axial direction so that grease can be forced into and through the passageway to the bearing when the member is attached fto the bearing.

2. The invention as set forth in claim 1 further comprising means adjacent each of said ends for receiving a tool used to force the ends toward each other and thereby flex the reservoir member to position the flange in the groove or remove the flange from the groove.

3. The invention as set forth in claim 1 wherein the reservoir has a generally cylindrical inner surface, and a side extending from the inner surface to the one side edge of the outer surface, the side tapering inwardly from the outer surface to the inner surface, and one end of the passageway being at the side between the inner surface and the outer surface so that grease forced through the passageway enters a cavity defined by the side of the reservoir member and the bearing.

4. The invention as set forth in claim 3 further comprising two tabs, one such tab being located at each end of the reservoir member and at the ends of the side of the member, the tabs being inclined relative to the side to seal the ends of the cavity and deflect grease toward the bearing.

* * * * *